United States Patent [19]

Turner

[11] 3,880,901

[45] Apr. 29, 1975

[54] ALUMINUM-CONTAINING PHARMACEUTICAL COMPOSITIONS

[75] Inventor: John Harry Wallice Turner, Chapel-en-le-Frith, England

[73] Assignee: Hardman & Holden Limited, Miles Platting, Manchester, England

[22] Filed: July 3, 1972

[21] Appl. No.: 268,266

[30] Foreign Application Priority Data
Jan. 28, 1972 United Kingdom............... 4035/72
July 6, 1971 United Kingdom.............. 31658/71

[52] U.S. Cl.... 260/448 AD; 260/239.1; 260/448 R; 260/448 B; 260/999
[51] Int. Cl. .............................................. C07f 5/06
[58] Field of Search ...... 260/448 B, 448 R, 448 AD

[56] References Cited
UNITED STATES PATENTS
2,959,606  11/1960  Mitra et al. .................... 260/448 B
3,100,787  8/1963  Staib .............................. 260/448 B
3,173,934  3/1965  Davison......................... 260/448 B
3,184,490  5/1965  Davison ........................ 260/448 R
3,352,893  11/1967 Holbert et al. ................. 260/448 B
3,492,329  1/1970  Davison et al. ................ 260/448 B FOREIGN PATENTS OR APPLICATIONS
11,125  7/1963  Japan
11,984  7/1963  Japan

*Primary Examiner*—Helen M. S. Sneed
*Attorney, Agent, or Firm*—James R. Thornton

[57] ABSTRACT

Pharmaceutically active compositions based on aluminum are prepared by reacting a pharmaceutically active compound with an aluminum alkoxy compound in the absence of added solvent.

11 Claims, No Drawings

ALUMINUM-CONTAINING PHARMACEUTICAL COMPOSITIONS

This invention relates to an improved process for the manufacture of aluminum containing pharmaceutical compounds.

The use of aluminum derivatives of carboxylic acids as a means of administering the pharmacologically active carboxylic compounds has been known for many years. One of the advantages of using these aluminum derivatives is that it enables large doses of carboxylic acids to be administered, which if used in the form of the free acid or an alkali metal or similar salt, would prove harmful to the patient. For example, large doses of acetylsalicylic acid which are required in the treatment of certain conditions tend to cause deleterious side effects such as stomach ulceration and nausea. However, it is well known that the necessary large doses of acetylsalicylic acid may be given safely in the form of an aluminum derivative such as that sold in the United Kingdom under the name of ALOXIPRIN. A further example of the potential use of an aluminum compound of a pharmacologically active substance so as to enable large doses to be administered in safety is in tuberculosis therapy employing p-aminosalicylic acid.

In general, the aluminum compounds used in the aforementioned manner are prepared from a reaction involving the free acid with an aluminum alkoxide, usually aluminum isopropoxide and water, in the presence of the corresponding alcohol as a solvent. This reaction however suffers from the disadvantage that often the pharmacologically active material undergoes a chemical reaction with the alcohol at some stage of the process whereby a proportion of it, which may be considerable, is decomposed to yield either materials which are undesirable or substances having greatly reduced pharmacological action. This may be illustrated by reference to the process for the manufacture of aluminum acetylsalicylate. One form of this material is prepared from the reaction between aluminum isopropoxide, water and acetylsalicylic acid in isopropanol as a solvent. The aluminum isopropoxide undergoes a reaction with the water to form oxoaluminum isopropoxide.

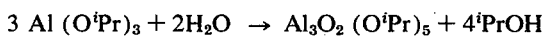

The oxoaluminum isopropoxide then combines with the acetylsalicylic acid (H.Asp) to form the aluminum acetylisalicylate.

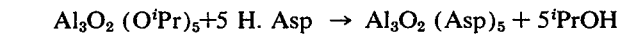

The final dry product may be obtained by the removal of the isopropanol solvent. It is at this stage that the aforementioned disadvantage occurs. It has been found that, irrespective of what steps are taken, it is not possible to prevent a side reaction occurring between the solvent isopropanol and the acetyl group bound to the aromatic nucleus of the acetylsalicylic acid bonded to the aluminum atoms, whereby deacetylation occurs with the formation of some aluminum salicylate and propyl acetate.

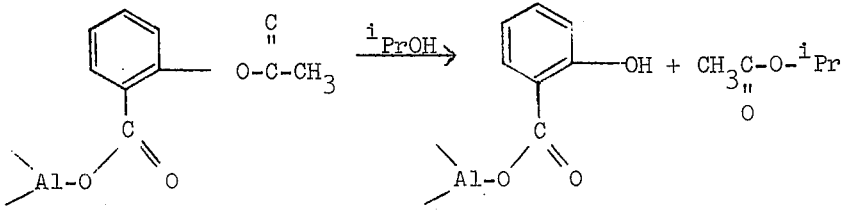

An alternative procedure for the preparation of aluminum containing pharmaceuticals is from aluminum isopropoxide instead of oxo-aluminum isopropoxide. In the case of the acetylsalicylic acid derivatives this proceeds firstly through the formation of the two aluminum isopropoxy acetylsalicylates.

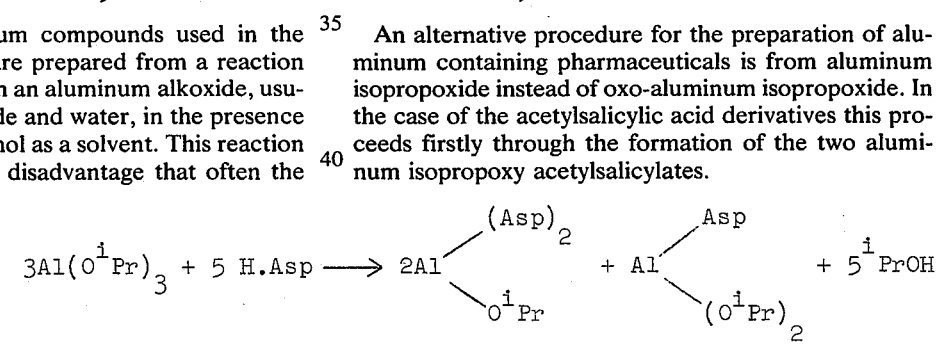

The isopropoxy groups remaining attached to the aluminum atoms may be replaced by hydroxy groups by hydrolysis with water either before or after the solvent has been removed.

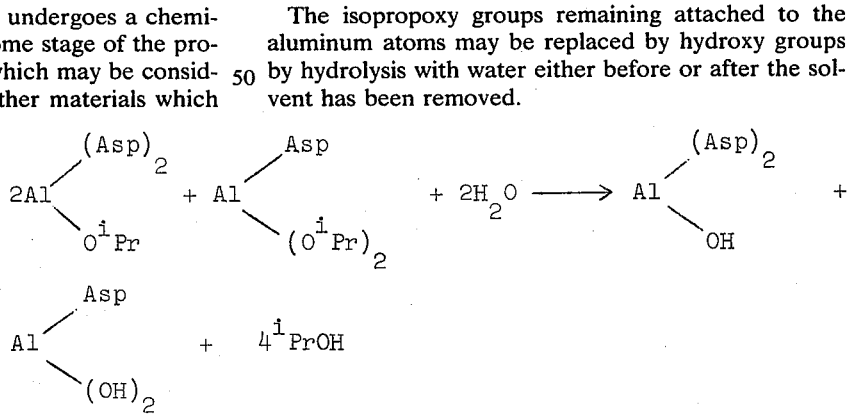

These two hydroxy aluminum derivatives may then be condensed to form an aluminum acetylsalicylate.

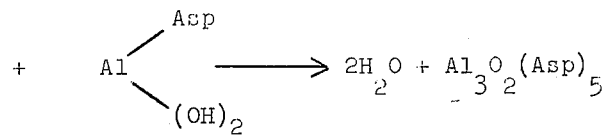

Irrespective of the stage at which the hydrolysis reaction is carried out, the removal of the isopropanol solvent is always accompanied by the formation of some isopropyl acetate due to the deacetylation of acetylsalicylic acid group in the same way as when oxo-aluminum isopropoxide is used as the starting material.

It is the object of this invention to provide a method for the manufacture of aluminum containing pharmaceutical compositions free from the aforementioned disadvantage whereby undesirable by-products are formed.

Accordingly, the present invention provides a process for the production of a pharmaceutically active composition which comprises intimately mixing a solid pharmaceutically active compound with an aluminum alkoxy compound and, where necessary, heating the mixture, without added solvent, to a temperature high enough to liquify the aluminum alkoxide but lower than the boiling point at atmospheric pressure of the alcohol generated in the reaction.

The reaction proceeds rapidly and the alcohol formed as a result of the reaction may be removed by distillation either during the reaction or subsequently. Preferably the alcohol is removed at reduced pressure. The final stage of the process involving hydrolysis may be brought about by exposing the initial product to atmospheric moisture. Any further alcohol liberated during hydrolysis may be allowed to evaporate on standing or may be removed at reduced pressure. If the alcohol formed during the first stage of the process is not removed at the end of that stage it may be removed with any alcohol formed during the hydrolysis stage.

The aluminum alkoxy compound may be in either powdered or liquid form.

In one embodiment of the process it has been found that the reaction between an aluminum alkoxy compound and a pharmaceutically active material in the absence of added solvent may conveniently be carried out using injection molding techniques so as to provide the aluminum-containing pharmaceutical composition in tablet form. For this purpose the reaction mixture is passed through a heated extruder barrel of an injection molding machine to the mold cavity. The reaction takes place during the injection molding process. The molding process is preferably carried out at temperatures high enough to liquify the aluminum alkoxide if necessary but lower than the boiling point at atmospheric pressure of the alcohol released by the reaction, since there is a tendency at high temperatures for the alcohol vapor to cause expansion of the tablet as soon as it is ejected from the mold.

In a modification of the invention either ice or water is intimately mixed with a powdered pharmaceutically active compound and then an aluminum alkoxy compound is added to the premix of ice or water and pharmaceutically active compound. The temperature is allowed to rise so that the condensation reaction between the pharmaceutically active compound and the aluminum alkoxy compound and hydrolysis can take place.

If the aluminum alkoxy compound used is in powdered form, sufficient water to bring about the hydrolysis step is uniformly distributed on the powdered pharmaceutical compound before incorporation into the reaction mixture. Thus a proportion of the solid pharmaceutically active material is mixed with about the theoretical amount of water to bring about the hydrolysis stage. The temperature of the mixture may, if desired, be reduced to below 0°C. so as to solidify the water and to ensure even greater control of the reaction process. Alternatively, powdered ice may be mixed with some or all of the pharmaceutically active compound.

The reaction mixture is formed firstly by intimately mixing either ice or water with the pharmaceutically active compound. The pharmaceutically active compound to which water has been added may, if desired, subsequently be frozen. This mixture is then intimately mixed with the powdered aluminum alkoxy compound at a temperature preferably below 0°C. On allowing the agitated mixture to warm up an exothermic reaction takes place and both the condensation reaction between the pharmaceutically active compound and the aluminum alkoxy compound and the hydrolysis reaction take place. The alcohol may be removed by distillation, preferably under vacuum either during the reaction or subsequently. In this manner, the amount of alcohol present in the reaction mixture is relatively small and its residence time in the reaction mixture short so as to ensure that little or no side reaction of the type already referred to can take place. The resultant product may easily be formed into tablets by conventional means.

It has been found in practice that when the above process is carried out using a powdered aluminum alkoxy compound, while giving rise to a product which does not suffer adversely from the effects of deacetylation, can unless carefully controlled and using powdered aluminum isopropoxide in a sufficiently highly comminuted form, yield a product containing unacceptably large quantities of uncombined pharmaceutical compound and/or free hydrated aluminum oxide. This disadvantage is thought to result from the inadequate homogeneity of the reactants.

It has been found that the foregoing disadvantages can be overcome by the use of a liquid aluminum alkoxide.

Accordingly, a preferred process comprises intimately mixing either ice or water with a pharmaceutically active compound, adding the ice or water and pharmaceutically active compound premix to the liquid aluminum alkoxy compound and then allowing the temperature to rise so that the condensation reaction between the pharmaceutically active compound and the aluminum alkoxy compound and hydrolysis take place.

The reaction mixture is formed firstly by intimately mixing either ice or water with the pharmaceutically active compound. The pharmaceutically active compound to which water has been added may, if desired, subsequently be frozen. This mixture is then added with stirring to a liquid aluminum alkoxy compound, preferably at ambient temperatures, for example, liquid depolymerised aluminum isopropoxide. Conversely, liquid aluminum alkoxide may be added to the premix of pharmaceutically active compound or compounds and water. The exothermic reaction involving both the condensation of the pharmaceutically active compound(s) and the aluminum alkoxy compound, and the hydrolysis reaction then takes place. By replacing the solid aluminum alkoxy compound with a liquid aluminum alkoxy compound, it has been found that the reaction provides a product which is virtually free from uncombined pharmaceutically active compound and uncombined hydrolysis products formed from the aluminum alkoxy compound and water.

If desired, a small quantity of stearic acid (H.St) or other fatty acid or fatty alcohol may be added so as to act as a hydrolysis control agent modifying the rate at which the acid contained in the stomach causes the pharmaceutically active material to be released from the aluminum compound. Furthermore, if tablets are to be formed by the injection molding technique, the addition of a fatty acid or fatty alcohol to the initial reaction mixture provides a lubricant during the extrusion stage.

The reaction may be illustrated by the equation:

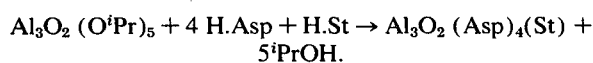

Additionally, the rate of release of the pharmaceutically active compound from tablets formed either by conventional means from the powdered products of the aforementioned reactions or from the injection molding process, may be controlled by incorporating a surfactant in the initial reaction mixture. The surfactants are exemplified by polyglycols, polyglycol esters, polyethylene oxide condensates and sulphosuccinates. These surfactants control the rate of disintegration of the tablet in the stomach which in turn controls the rate of hydrolysis by altering the rate at which a fresh surface of the aluminum containing compounds becomes exposed to the gastric juices.

The following compounds are representative pharmaceutical materials which may be used advantageously in the form of their aluminum derivatives prepared by the aforesaid process:

Carboxylic acids, phenolic compounds, paracetamol, nicotinic acid, ascorbic acid, calciferol, methylthiouracil, oxytetracycline, p-(dipropylsulphamoyl)-benzoic acid and guaiphenesin (3-o-methoxyphenoxypropane-1,2-diol).

The process is particularly valuable in the preparation of aluminum acetylsalicylate derivatives. Aluminum isopropoxide and/or oxoaluminum isopropoxide are mixed in the solid form with the stiochiometric proportions of acetylsalicylic acid and other components required in the final product.

The embodiment of the invention in which ice is used as a source of water for hydrolysis is particularly suitable for producing aluminum-containing pharmaceuticals based on antibiotics such as penicillanic acid. The reaction conditions in this embodiment are sufficiently mild to minimize damage to the antibiotic.

The invention is illustrated by the following examples.

EXAMPLE 1

An intimate mixture of 612 g. of powdered aluminum isopropoxide, 900 g. of acetylsalicylic acid and 20 g. of stearic acid was passed through a meter tube heated to 100°C. by means of a steam jacket at the rate of 10 g. of mixture per minute. The product was collected in a 10 litre flask. After all of the product had been collected, moist filtered air was passed through the flask for 1 hour while the product was agitated. The flask was then evacuated to remove the last trace of isopropanol. The product, which contained less than 1% of salicylic acid compound as a result of deacetylation, was powdered and tableted in the conventional manner.

EXAMPLE 2

An intimate mixture of 612 g. of powdered aluminum isopropoxide, 900 g. of acetylsalicylic acid, 20 g. of stearic acid and 6 g. of polyethylene oxide was passed through an extruder barrel of an injection molding machine into the mold cavity. The molding temperature was 80°. The tablets so formed still contained some isopropanol which, after exposure to the moist air for 1 hour, was removed in a vacuum drying oven. As with Example 1 the product, in tablet form, contained less than 1% of salicylic acid due to deacetylation.

EXAMPLE 3

Acetylsalicylic acid (200 g.) was mixed with 40 g. of water and the mixture cooled to −10°C. so as to convert the water into ice. While maintaining this mixture at −10°C. a further 700 g. of acetylsalicylic was blended with it and the resultant mixture was mixed in an open reactor with 612 g. of powdered aluminum isopropoxide. The final mixture was thoroughly mixed in a Z blade mixer while maintaining the temperature at below 0°C. The mixture was then transferred to a large open vessel and allowed to warm up to above 0°C. An exothermic reaction immediately started and most of the isopropanol formed was removed by evaporation. After 1 hour the mixture was transferred to a vacuum oven heated to 30°C. and the remaining isopropanol removed. The product, a finely divided solid, contained less than 1% salicylic acid formed as a result of deacetylation and could be ground and formed into tablets by conventional techniques.

EXAMPLE 4

Water (20 mols - 180 parts) was added to powdered salicylic acid (9 mols - 1243 parts) contained in a jacketed Z blade mixer and the mix cooled below 0°C. by the introduction of solid $CO_2$. Aluminum isopropoxide (10 mols - 2040 parts) in powdered form was then added, followed by stearic acid (1 mol - 284 parts) and while the powdered mixture was mechanically fluidized, heat was slowly applied to bring about reaction between the four components. The isopropanol liberated as a result functioned as a solvent for the stearic acid facilitating its reaction with the aluminum alkoxide and was eventually removed by vacuum distillation. The resulting product was a powder combining dihydroxy aluminum salicylate and dihydroxy aluminum stearate and can be tabulated either by the dry slugging technique or by the use of a hydrocarbon oil such as liquid paraffin as a tabulating agent.

In addition to providing a more pure product, the process of this invention in which no added solvent is used is rapid and more economical to operate than that, for example, whereby aluminum acetylsalicylate is prepared by the established process.

Aluminum salicylate manufactured by this process is a potentially valuable pharmaceutical material. Salicylic acid itself is known to be a powerful analgesic but has the disadvantage of causing severe stomach ulceration. This disadvantage would still be present in aluminum salicylate made by the conventional methods due to its undergoing rapid hydrolysis. However, when prepared by the process of this invention from salicylic acid and either aluminum alkoxide or an oxoaluminum alkoxide and incorporating either a fatty acid or fatty alcohol to control the rate of hydrolysis, this disadvantage is removed.

EXAMPLE 5

Dry acetylsalicylic acid (385 lbs.) was placed in a Baker-Perkins mixer and water (22 lbs.) was sprayed onto it so as to obtain even distribution over the acid.

The mixture was kept at room temperature and liquid depolymerised aluminum isopropoxide (265 lbs.), also at room temperature, was added with mixing over a period of 1 hour. Cooling was applied during the addition and for an additional hour. The mixture was then heated to 60°C. and a vacuum applied until the theoretical quantity of isopropanol had been collected. The product was then cooled and milled to a form suitable for conversion into tablets.

EXAMPLE 6

Water (36 lbs.) was added to guaiphenesin (396 lbs.) in a jacketed Z-blade mixer and thoroughly incorporated by mixing. To the mixture there was slowly added with agitation 408 lbs. of aluminum isopropoxide. An exothermic reaction developed and after the reaction was complete, there being no further rise in temperature, the isopropanol liberated was removed by distillation. The aluminum guaiphenesin compound was obtained as a white powder in a form suitable for conversion into tablets.

What is claimed is:

1. The process for the production of a pharmaceutically active composition which comprises intimately mixing ice or water with powdered acetylsalicylic acid in the absence of added solvent thereby obtaining an evenly distributed powdered mixture and then adding an aluminum alkoxy compound selected from aluminum alkoxide, oxoaluminum alkoxide, and mixtures thereof to the premix of ice or water and acetylsalicylic acid and then allowing the temperature to rise so that the condensation reaction between the acetylsalicylic acid and the aluminum alkoxy compound and hydrolysis take place.

2. The process according to claim 1 wherein the temperature of the water and pharmaceutically active compound premix is reduced to below 0°C.

3. The process according to claim 1 wherein the powdered aluminum alkoxy compound is intimately mixed with ice or water and pharmaceutically active compound premix at a temperature below 0°C.

4. The process for the production of aluminum acetylsalicylate which comprises intimately mixing water with powdered acetylsalicylic acid, adding the resultant powdered premix to liquid depolymerized aluminum isopropoxide and then allowing the temperature to rise so that the condensation reaction between the acetylsalicylic acid and the aluminum alkoxy compound and hydrolysis take place.

5. The process according to claim 4 in which water and acetylsalicylic acid premix is added to the liquid aluminum alkoxy compound at ambient temperature.

6. The process according to claim 1 wherein said aluminum alkoxy compound is aluminum isopropoxide or oxoaluminum isopropoxide.

7. The process according to claim 1 in which a stoichiometric amount of water is mixed with said powdered acetylsalicylic acid.

8. The process for the production of a pharmaceutically active composition which comprises intimately mixing a pharmaceutically active compound with an aluminum alkoxy compound selected from aluminum alkoxide, oxoaluminum alkoxide, and mixtures thereof and heating the resultant mixture, without added solvent, to a temperature high enough to liquify the powdered aluminum alkoxy, but lower than the boiling point at atmospheric pressure of the alcohol generated in the reaction, in which said pharmaceutically active compound is acetylsalicylic acid.

9. The process for the production of a pharmaceutically active compound which comprises intimately mixing ice or water with a powdered pharmaceutically active compound in the absence of added solvent thereby obtaining an evenly distributed powdered mixture and then adding an aluminum alkoxy compound selected from aluminum alkoxide, oxoaluminum alkoxide, and mixtures thereof to the premix of ice or water and pharmaceutically active compound and then allowing the temperature to rise so that the condensation reaction between the pharmaceutically active compound and the aluminum alkoxy compound and hydrolysis take place, wherein said pharmaceutically active compound is salicylic acid.

10. The process for the production of a pharmaceutically active compound which comprises intimately mixing ice or water with a powdered pharmaceutically active compound in the absence of added solvent thereby obtaining an evenly distributed powdered mixture and then adding an aluminum alkoxy compound selected from aluminum alkoxide, oxoaluminum alkoxide, and mixtures thereof to the premix of ice or water and pharmaceutically active compound and then allowing the temperature to rise so that the condensation reaction between the pharmaceutically active compound and the aluminum alkoxy compound and hydrolysis take place, wherein said pharmaceutically active compound is guaiphenesin.

11. Aluminum guaiphenesin.

* * * * *